United States Patent Office 3,468,852
Patented Sept. 23, 1969

---

3,468,852
POLYAMIDE-ACID AMIDE-ACID AND POLY-IMIDE-IMIDE COMPOSITIONS
Ralph G. Flowers, Pittsfield, and Thomas L. Sherer, Richmond, Mass., assignors to General Electric Company, a corporation of New York
No Drawing. Filed Apr. 12, 1966, Ser. No. 541,943
Int. Cl. C08g 20/32
U.S. Cl. 260—78                                                        5 Claims

---

ABSTRACT OF THE DISCLOSURE

This invention relates to new polyamide-acid amide-acids and polyimide-imides compositions prepared by reacting polyamide-acid diamines with dianhydrides, said compositions being useful for electrical insulating purposes in the form of films or coatings.

---

This invention relates to new and useful compositions of matter. More particularly, it relates to new and useful polyamide-acid materials and polyimides derived therefrom which are characterized by good physical and electrical properties, and to their precursor polyamide acids, and to intermediates useful for the preparation of such compositions.

The preparation of polyamide-acids by the reaction under suitable conditions and using compatible solvents of aromatic diamines and aromatic dianhydrides is well known as described, for example, in Patents 3,179,614, 3,179,634 and 3,190,856. The preparation of polyamide-modified polyimides containing aromatic groups is also well known, as set forth, for example, in Patent 3,179,-635. While such materials are characterized by desirable physical and electrical properties, they are subject to certain drawbacks. The highly aromatic nature of such materials generally requires the use of relatively expensive solvents such as N,N-dimethyl formamide, N-methyl-2-pyrrolidone, N,N-dimethyl acetamide and the like. Further, such materials taken as a group are rather difficult to obtain in the form of films or coatings, as on electrical conductors, without the use of special equipment. Heavy builds adequate for generally required electrical insulating purposes are usually subject to dislocations and powdering. Finally, a rather specialized cure cycle is required to obtain polymer coatings of such materials from the solutions.

It is an object of the present invention to provide novel polyimide compounds useful for electrical insulating purposes, and especially in the form of films or coatings, as on electrical conductors, and to provide novel intermediate compositions useful in the preparation of such compounds.

It is another object of the invention to provide polyimide compositions of the above type having good flexibility, toughness and good electrical properties, and which are obtainable from specific precursors which are additionally soluble in such easily obtainable and inexpensive solvents as cresol, and which may be reacted without the use of heat.

Briefly, the present invention relates to novel polyamide-acid diamines and to polyamide-acid amide-acids and polyimide-imides prepared therefrom. The polyamide-acid diamine is prepared by reacting at least one dianhydride having the formula

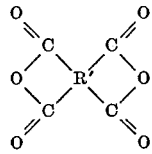

where R' is a tetravalent organic radical containing at least two carbon atoms and selected from substituted and unsubstituted aliphatic, cycloaliphatic, heterocyclic, and alkyl-aromatic groups, and combinations of such groups, with at least one aromatic diamine having the formula $$H_2N—R''—NH_2$$

where R'' is a divalent aromatic group, the two amino radicals being attached to separate carbon atoms of the divalent group.

Among the dianhydrides useful in this connection are Nadic dianhydride, benzalazine dianhydride, cycloaliphatic dianhydrides such as Araldite X8157/118, 1,2,3,4-cyclopentane tetracarboxylic acid dianhydride (cyclopentane dianhydride), ethylene-bis (trimellitate) dianhydride, etc.

The Nadic dianhydride is di(succinic anhydride-ethylidene)benzene and has the following structural formula:

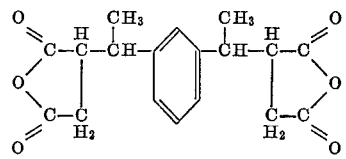

The benzalazine dianhydride (a heterocyclic dianhydride) is 1,2,3,5,6,7-hexahydro-3,7-dihpenylpyrazole (1, 2) pyrazole-1,2,5,6-tetracarboxylic dianhydride, and has the following structural formula:

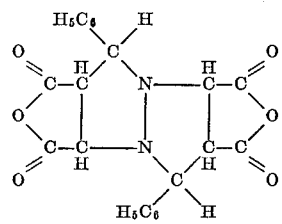

The ethylene-bis(trimellitate) dianhydride has the following structural formula:

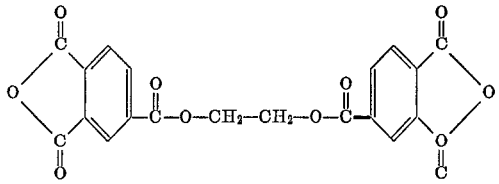

The above mentioned Araldite dianhydride is 7,7'-(2-butenylene)di-2 norbornene-5,6-dicarboxylic anhydride and has the following structural formula:

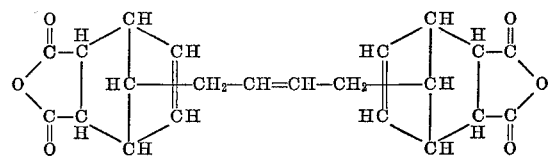

Among the diamines which may be used are those listed in Patent 3,179,614 and elsewhere, including benzidine, 4,4'-diamino diphenyl ether, 3,3'-dimethoxy-4,4'-diamino diphenyl methane, meta-phenylene diamine, para-phenylene diamine, 4,4'-diamino diphenyl methane, and others.

In preparing the polyamide-acid diamine, the dianhydride is reacted with diamine, which is about one mole in excess, each ingredient being initially prepared in a 20% by weight cresol solution. The reaction takes place immediately upon mixture of the two solutions at room temperature and normally no heating is required for the reaction. At least one aromatic dianhydride is cresol solution is then added to the reaction mixture and reacted for up to about ten minutes at from room temperature to about 100° C. to produce the polyamide-acid amide-acid which can be further converted, as by heat, to the imide stage.

While cresol is particularly preferred as a solvent, other solvents could be used, such as N-methyl-2-pyrrolidone, N,N-dimethyl formamide, N,N-dimethyl acetamide, and others.

The polyamide-acid diamine of the present invention may be expressed by the formula:

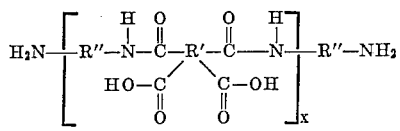

where R' is as defined previously and R'' is an aromatic group, such as phenyl, diphenyl, diphenyl ether, diphenyl ketone, etc., substituted or unsubstituted; and $x$ varies from about 1–3. Generally speaking, increasing $x$ above 3 produces increasingly brittle final polymers which, while useful for some purposes, do not provide flexible, tough films and coating materials. However, the diamine itself may be of any length as such.

In preparing the polyamide-acid amide-acid, the amine-terminated polyamide-acid is reacted in essentially equimolar amounts with a dianhydride having the formula

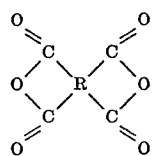

wherein R is a tetravalent organic radical selected from substituted and unsubstituted aromatic groups. Among the dianhydrides useful in this connection are pyromellitic dianhydride,
2,3,6,7-naphthalene tetracarboxylic dianhydride,
3,3',4,4'-diphenyl tetracarboxylic dianhydride,
1,2,5,6-naphthalene tetracarboxylic dianhydride,
2,2',3,3'-diphenyl tetracarboxylic dianhydride,
2,2-bis(3,4-dicarboxyphenyl)propane dianhydride,
bis(3,4-dicarboxyphenyl) sulfone dianhydride,
perylene 3,4,9,10-tetracarboxylic acid dianhydride,
bis(3,4-dicarboxyphenyl) ether dianhydride,
naphthalene-1,2,4,5-tetracarboxylic dianhydride,
2,2-bis(2,3-dicarboxyphenyl) propane dianhydride,
1,1-bis(2,3-dicarboxyphenyl) ethane dianhydride,
1,1-bis(3,4-dicarboxyphenyl) ethane dianhydride,
bis(2,3-dicarboxyphenyl) methane dianhydride,
bis(3,4-dicarboxyphenyl) methane dianhydride,
benzene-1,2,3,4-tetracarboxylic dianhydride,
pyrazine-2,3,5,6-tetracarboxylic dianhydride,
thiophene-2,3,4,5-tetracarboxylic dianhydride,
3,4,3',4'-benzophenone tetracarboxylic dianhydride, etc.

The reaction between the dianhydride and the polyamide-acid diamine is generally carried out by dissolving the dianhydride in enough cresol to produce a solids content of about 20% by weight, adding it to the poly-amide-acid amine and reacting the mixture for up to about 10 minutes at room temperature to 100° C., and cooling to about 40–50° C., the final product being a polyamide-acid amide-acid having the general formula:

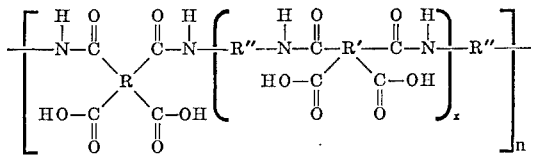

where R, R', R'', and $x$ are as defined above and $n$ is at least 2. When heated at a temperature of about 250° C. or higher for times ranging from about 5 minutes upward, the polyamide-acid amide-acid is converted to an imide-imide having the formula:

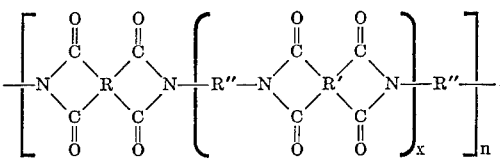

where the various constituents are as defined as above.

Alternatively, the polyimide-imide may be formed as a copolymer by first obtaining a polyamide-acid amide-acid dianhydride and reacting the latter with an aromatic diamine, as illustrated in Example 9 below. The copolymer has the following structural formula:

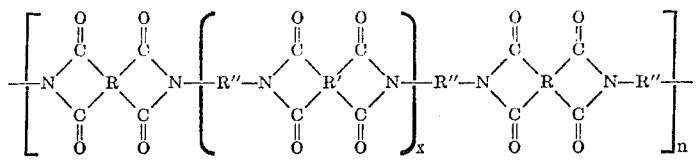

where R is a tetravalent organic radical selected from substituted and unsubstituted aromatic groups; R' is a tetravalent organic radical containing at least two carbon atoms and selected from substituted and unsubstituted aliphatic, cyclo-aliphatic, heterocyclic, and alkyl-aromatic groups, and combinations thereof; R'' is an aromatic group; $x$ is at least 1, and $n$ is at least 2.

The examples below will illustrate the practice of the invention, it being understood that they are to be taken as exemplary only. In the examples, the proportions of the ingredients are given in parts by weight.

EXAMPLE 1

19.8 parts of 4,4' diamino diphenyl methane and 16.5 parts of Nadic dianhydride were separately dissolved in cresol sufficient to provide 20% by weight solutions. Each mixture was warmed sufficiently to bring about solution in the cresol, and each solution was then cooled to below 100° C. The solution of diamine was then added to the solution of Nadic dianhydride with stirring, the ingredients reacting to produce polyamide-acid diamine. To this solution there was added a solution containing 16.1 parts of 3,3',4,4'-benzophenone tetracarboxylic dianhydride (referred to hereinafter as benzophenone dianhydride) in sufficient cresol to provide a 20% by weight solution. This mixture reacted to form polyamide-acid amide-acid. The solution thus provided was cast onto aluminum sheet material, and the coating heated to 220° C. for ten minutes for driving off the solvent, followed by heating at 300° C. for five minutes. This process produced a film on the aluminum sheet material of polymide-imide. The film was flexible and tough, could be creased without breaking, and did not craze when treated with acetone.

EXAMPLE 2

20% cresol solutions weer prepared of 39.5 parts 4,4'-diamino diphenyl methane and 37.9 parts of Araldite dianhydride, respectively, by procedures similar to that of Example 1 and these solutions were mixed to provide a solution of a polyamide-acid diamine. To this solution there was added a 20% solution of 32.2 parts benzophenone dianhydride in cresol, and the resulting solution was cast onto an aluminum sheet, heated to 220° C. and then to 300° C. in a procedure similar to that of Example 1. Very flexible, tightly adherent polymer films 1–4 mils thick were thus produced.

Copper wire coated with this polymer which was cured at 200° C. for 15 minutes and 300° C. for five minutes was tested for dissipation factor characteristics with the following representative results: 1.5% dissipation factor at 100° C., 2.4% at 150° C., 2.9% at 190° C., and 20% at 250° C. These results constituted a marked improvement over the results obtained from previously used wire coating polymers such as polyvinyl acetal, the polyimide of pyromellitic dianhydride and oxydianiline, and polyamide-imide which were subjected to comparable curing processes.

EXAMPLE 3

Example 1 was repeated using solutions of 19.8 parts 4,4'-diamino diphenyl methane and 20.2 parts benzalazine dianhydride, which were reacted and then had added thereto a cresol solution or 16.1 parts benzophenone dianhydride. Polyimide-imide films produced from this reaction were found to be very flexible, tough and tightly adhering to aluminum sheet material.

EXAMPLE 4

Example 1 was repeated using cresol solutions of 59.4 parts 4,4' diamino diphenyl methane and 38 parts Araldite dianhydride, these solutions being mixed, and to the reaction product of this solution there was added 16.1 parts benzophenone dianhydride in cresol. From the reaction of these ingredients very flexible adherent films 1 mil thick were obtained on aluminum sheet material.

EXAMPLE 5

Example 1 was repeated using cresol solutions of 10.8 parts of m-phenylene diamine and 16.5 parts Nadic dianhydride, and to this mixture there was added 16.1 parts benzophenone dianhydride. This solution was cast and cured to form a very flexible film similar to those obtained in the prior examples.

EXAMPLE 6

Example 1 was repeated using solutions of 19.8 parts 4,4'diamino diphenyl methane and 20.5 parts of ethylene-bis (trimellitate) dianhydride, the solutions being mixed at about room temperature to react the components to form a polyamide-acid diamine. The resultant solution was mixed with a 20% by weight cresol solution of 16.1 parts benzophenone dianhydride. The product thus obtained was cast on an aluminum disk and cured as in the previous examples and a flexible, tightly adherent film was likewise obtained.

EXAMPLE 7

Solutions of 19.8 parts 4,4'diamino diphenyl methane and 10.5 parts cyclopentane dianhydride in cresol were mixed and to the resultant solution 16.1 parts benzophenone dianhydride in a 20% cresol solution was added, and from this solution very flexible films up to 5 mils thick were obtained by the process described in Example 1.

EXAMPLE 8

Example 1 was repeated using N-2 methyl pyrrolidone solutions of 39.6 parts 4,4'diamino diphenyl methane and 38 parts Araldite dianhydride, these solutions being mixed, and to the reaction product of this solution was added first an N-2 methyl pyrrolidone solution of 16.1 parts of benzophenone dianhydride and then an N-2 methyl pyrrolidone solution of 10.9 parts of pyromellitic dianhydride. From the reaction of these ingredients flexible 1 and 2 mil films were formed. This material did not cut through in 20 minutes at 300° C. as compared to previously known wire enamel which cuts through in 3 minutes at 220° C. on the same apparatus. The film was still very flexible after this test.

EXAMPLE 9

Example 1 was repeated using N-2 methyl pyrrolidone solutions of 19.8 parts, 4,4'-diamino diphenyl methane and 19 parts Araldide dianhydride, these solutions being mixed, and to the reaction product of this solution was added an N-2 methyl pyrrolidone solution of 32.2 parts benzophenone dianhydride, and finally to this combined solution was added another N-2 methyl pyrrolidone solution of 9.9 parts 4,4'-diamino diphenyl methane. From the reaction of these ingredients, flexible films up to 8 mils thick were obtained. A film of this polymer did not cut through at 300° C. in 30 minutes.

There are thus provided in accordance with the invention new and useful polyamide-acid diamines and polyamide-acid amide-acids and polyimide-imides prepared from such diamines which possess desirable physical and electrical characteristics. They are, furthermore, simply prepared using inexpensive solvents such as cresol, and the immediate reaction of the starting ingredients may be obtained without the necessity for external heating or apparatus therefor as usually required in prior art polymer processes. The polyimide-imide films produced by the present invention are high temperature resistant, tough, very flexible and tightly adherent to supporting surfaces such as electrical conductors.

What we claim as new and desire to secure by Letters Patent of the United States is:

1. A polyamide-acid amide-acid consisting of recurring units of the formula:

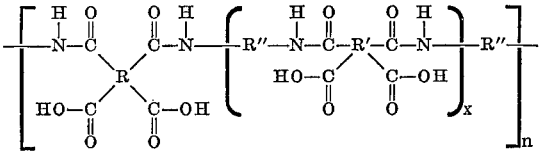

where R is selected from the group consisting of benzene, naphthalene, diphenyl, perylene, diphenyl ether, diphenyl sulfone, diphenyl ketone, and diphenyl alkylene wherein the alkylene group has 1–3 carbon atoms; R' is a tetravalent organic radical containing at least two carbon atoms and selected from the group consisting of a cycloaliphatic hydrocarbon group, a heterocyclic group, and an alkylene-aromatic hydrocarbon group and wherein any joined aromatic groups are separated by at least two atoms; R" is an aromatic group; $x$ is at least 1; and $n$ is at least 2.

2. A polyimide-imide consisting of recurring units of the formula:

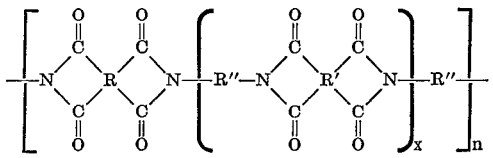

where R is selected from the group consisting of benzene, naphthalene, diphenyl, perylene, diphenyl ether, diphenyl sulfone, diphenyl ketone, and diphenyl alkylene wherein the alkylene group has 1–3 carbon atoms; R' is a tetravalent organic radical containing at least two carbon atoms and selected from the group consisting of a cycloaliphatic hydrocarbon group, a heterocyclic group, and an alkylene-aromatic hydrocarbon group and wherein any joined aromatic groups are separated by at least two atoms; R″ is an aromatic group; $x$ is at least 1; and $n$ is at least 2.

3. A polyimide-imide consisting of recurring units of the formula:

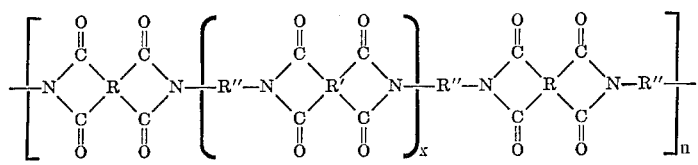

where R is selected from the group consisting of benzene, naphthalene, diphenyl, perylene, diphenyl ether, diphenyl sulfone, diphenyl ketone, and diphenyl alkylene wherein the alkylene group has 1–3 carbon atoms; R′ is a tetravalent organic radical containing at least two carbon atoms and selected from the group consisting of a cycloaliphatic hydrocarbon group, a heterocyclic group, and an alkylene-aromatic hydrocarbon group and wherein any joined aromatic groups are separated by at least two atoms; R″ is an aromatic group; $x$ is at least 1; and $n$ is at least 2.

4. A metal having a coating thereon of a polyimide-imide as defined in claim 2.

5. A metal having a coating thereon of a polyimide-imide as defined in claim 3.

References Cited
UNITED STATES PATENTS

| | | | |
|---|---|---|---|
| 3,179,614 | 4/1965 | Edwards | 260—30.2 |
| 3,179,635 | 4/1965 | Frost et al. | 260—78 |

WILLIAM H. SHORT, Primary Examiner

L. L. LEE, Assistant Examiner

U.S. Cl. X.R.

117—132, 161; 260—47, 65, 326, 514, 518, 534

UNITED STATES PATENT OFFICE
CERTIFICATE OF CORRECTION

Patent No. 3,468,852  September 23, 1969

Ralph G. Flowers et al

It is certified that error appears in the above identified patent and that said Letters Patent are hereby corrected as shown below:

Column 2, line 27, "dihpenylpyrazole" should read -- diphenylpyrazole --; lines 43 to 50, the extreme right portion of the formula should appear as shown below:

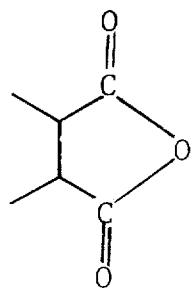

Column 3, line 1, "is" should read -- in --. Column 4, line 74, "weer" should read -- were --. Column 5, line 26, "or" should read -- of --.

Signed and sealed this 28th day of July 1970.

(SEAL)
Attest:

EDWARD M. FLETCHER, JR.
Attesting Officer

WILLIAM E. SCHUYLER, JR.
Commissioner of Patents